(12) United States Patent
Salesse et al.

(10) Patent No.: US 7,098,419 B2
(45) Date of Patent: Aug. 29, 2006

(54) DRIVING DEVICE AND CLAMPING TOOL EQUIPPED WITH SAME

(76) Inventors: Christian Salesse, 10, rue du Pilat F-07100, Annonay (FR); Jean-Marc Loriot, 15, rue Lakanal F-75015, Paris (FR)

( * ) Notice: Subject to any disclaimer, the term of this patent is extended or adjusted under 35 U.S.C. 154(b) by 244 days.

(21) Appl. No.: 10/471,062

(22) PCT Filed: Feb. 5, 2002

(86) PCT No.: PCT/FR02/00444

§ 371 (c)(1),
(2), (4) Date: Mar. 8, 2004

(87) PCT Pub. No.: WO02/076665

PCT Pub. Date: Oct. 3, 2002

(65) Prior Publication Data

US 2004/0140294 A1 Jul. 22, 2004

(30) Foreign Application Priority Data

Mar. 22, 2001 (FR) .................................. 01 03896

(51) Int. Cl.
*B23K 11/31* (2006.01)
(52) U.S. Cl. .................................. 219/86.32; 100/289
(58) Field of Classification Search ............. 219/86.25, 219/86.33, 86.51; 310/80; 74/89.23, 89.34, 74/89.35; 100/289; 251/251, 252
See application file for complete search history.

(56) References Cited

U.S. PATENT DOCUMENTS 3,606,801 A * 9/1971 Williams .................... 74/89.23
4,235,258 A * 11/1980 Uno et al. .................. 74/89.35
6,204,468 B1 * 3/2001 Habert ..................... 219/86.51

FOREIGN PATENT DOCUMENTS

| DE | 200 02 630 U1 | 6/2000 |
| EP | 1 057 569 A1 | 12/2000 |
| GB | 2 261 081 A | 5/1993 |

OTHER PUBLICATIONS

International Search Report of PCT/FR02/00444, dated Jun. 28, 2002.
International Preliminary Examination Report of PCT/FR02/00444, dated Oct. 16, 2002.

* cited by examiner

*Primary Examiner*—Clifford C. Shaw
(74) *Attorney, Agent, or Firm*—Christie, Parker & Hale, LLP

(57) ABSTRACT

The invention concerns a device comprising a screw (10) with pitch (P1) driven by a motor (M), a nut (12) co-operating with the screw (10) and designed to be driven in translation in the direction of the screw axis, said nut being integral in translation with a member (14), guide means (22L, 24L) defining a linear guiding to lock the rotation of the nut in a first phase of displacement, second guide means (22H, 24H) defining a helical guiding having a reverse pitch (P2) relative to the pitch of the screw to enable the transverse pitch and hence the translational speed of the nut to be decreased in said second phase of displacement. The inventive device can be used to produce a relative displacement between the members (16 and 28) of a clamping tool.

17 Claims, 3 Drawing Sheets

DRIVING DEVICE AND CLAMPING TOOL EQUIPPED WITH SAME

CROSS-REFERENCE TO RELATED APPLICATION

This application is a National Phase Patent Application of International Application Number PCT/FR02/00444, filed on Feb. 5, 2002, which claims priority of French Patent Application Number 01/03896, filed on Mar. 22, 2001.

TECHNICAL FIELD

The invention relates to a driving device adapted to effect the relative displacement of two members, in particular the two members of a tool.

More particularly, it aims to satisfy the requirements of motorisation of an axis forming part of a tool and, in particular, a clamping tool such as pliers or pincers.

BACKGROUND TO THE INVENTION

A typical example of clamping tools of this type are welding pincers which are used, in particular, on motor vehicle assembly lines. These pincers are intended to clamp a plurality of panels between themselves for the electric welding thereof.

In all cases, these pincers must allow, by means of appropriate motorisation, the relative displacement of two members, in this case the two arms or jaws of pincers, with two different movements or phases.

During clamping, in fact, it is desirable to be able to displace the two members first with a rapid movement then with a slower movement until final clamping is achieved.

For this purpose, it is known to use fluid-actuated jacks, in particular hydraulic jacks, to bring about the relative movement of the two members.

However, these clamping tools which employ jacks have the drawbacks inherent in such jacks, in particular risks of leaks, etc.

Electric clamping tools, in particular electric pincers, are also known which employ electric motorisation to bring about the relative displacement of the two members of the tool.

However, these electric tools suffer from problems associated with the characteristics of electric motorisation, namely high speeds of opening and closure and little clamping force or, on the contrary, a high clamping force and low speeds.

In clamping tools of the aforementioned type, it is essential, in view of the increasingly high speeds employed in industry, to be able to displace the members at a high speed while applying a high clamping force.

These two requirements, namely high speeds of opening and closure and high clamping force, cannot be met with the known solutions, even with motorisation employing electric motors without brushes.

In fact, these two requirements are incompatible as they arise from two contradictory kinematic definitions, namely:
- a high inertial load (opening and closure of the pincers) which involves a well-defined inertial ratio between load and motor and therefore a given reduction ratio and
- a high thrust load which generally defines a reduction ratio higher than the above-defined reduction ratio, in order to amplify the force generated by the torque of the motorisation system used.

This high thrust load is required to bring about the final clamping movement, for example the clamping of a plurality of panels by welding pincers.

Indexing devices which employ variable pitch screws or cams to obtain a variable reduction ratio are also known. However, these known devices are heavy and have significant inertia which makes them unsuitable for an application intended for a portable or mobile tool, and of which high performance and therefore low inertia are demanded.

SUMMARY OF THE INVENTION

The object of the invention is, in particular, to overcome the aforementioned drawbacks.

In particular, it aims to provide a driving device for the relative displacement of two members which is capable of providing a variable kinematic ratio.

The invention also aims to provide a driving device of this type which may be controlled electrically by a numerical control system.

A further aim of the invention is to provide a driving device of this type which is used in particular in the field of tools and, notably, clamping tools.

Yet a further object of the invention is to provide a driving device of this type which applies quite particularly to welding pincers.

The invention accordingly proposes a driving device of the type defined in the introduction, comprising:

a screw of a given pitch capable of being set into rotation about an axis in one direction or in an opposite direction by a motor, a nut cooperating with the screw and designed to be driven in translation in the direction of the screw axis, said nut being integral in translation with one of the two members, first guide means defining linear guidance parallel to the axis of the screw to lock the rotation of the nut in a first phase of displacement of the nut, second guide means defining helical guidance which extends along the axis of the screw and which has a reverse pitch relative to the pitch of the screw to allow the rotation of the nut in the same direction of rotation as the screw in a second phase of displacement of the nut where, for example, the two members are closer to one another than in the first phase of displacement, to enable the transverse pitch of the screw and hence the translational speed of the nut to be decreased in this second phase of displacement.

Therefore, the device of the invention is substantially based on the use of a screw which drives a nut, the nut being locked in rotation during a first phase or course of displacement and then being adapted to be set into rotation in the direction of rotation of the screw, in a second phase or course of displacement.

The invention therefore provides a driving device with a variable kinematic ratio which consists of two distinct parts: a first part where the rotation of the nut is locked and a second part where the nut is set into rotation in the same direction as the screw.

Owing to the first part, the screw provides a kinematic connection during a first phase which may be described as an inertial phase of the movement.

During this first phase, the nut which is mounted freely in translation is guided in rotation by the first guide means which are fixed and parallel to the axis of the screw and therefore prevent the nut from turning, whatever the direction of rotation of the screw and of the force to be transmitted. During this inertial phase, which allows the two members to be moved together or apart (for example, closure and opening of pincers), the screw will generally turn at a constant established speed. The speed of translation (linear velocity) of the nut is therefore determined by the angular velocity and the pitch of the screw.

During the second phase of displacement, the second guide means define helical guidance which obliges the nut to rotate in the same direction as the screw, and this reduces the transverse pitch of the screw.

Consequently, assuming that the screw turns at the same angular velocity as during the first phase of movement, the nut will therefore travel at a lower speed imposed by the transverse pitch. In fact, the nut which is "liberated" from the linear guidance of the first guide means will follow the pitch of the second guide means.

During this second phase of displacement, therefore, the speed of translation of the nut decreases until it optionally becomes zero. There is therefore an apparent variation in the pitch until its value reaches zero, if necessary.

It is advantageous to use a screw with a large and therefore reversible pitch and high yield to produce the kinematic connection during the inertial phase of the movement.

For this purpose, it is particularly preferably to use a screw selected from among a ball screw and a rolled thread screw.

This screw will preferably have a small diameter and therefore a small mass in view of the weakness of the forces generated during the first phase of displacement. This screw will therefore provide high-performance transmission in speed and in acceleration, with a minimal addition of inertia.

In a preferred embodiment of the invention, the first guide means and the second guide means are formed by at least one slideway comprising a linear portion parallel to the axis of the screw to provide the linear guidance and a helical portion which is connected to the linear portion to provide helical guidance and the nut is provided with a tracking component adapted to travel along the slideway.

Preferably, the device comprises at least one pair of opposing slideways with which there cooperates a pair of tracking components carried by the nut.

In the invention, it is particularly preferable that the or each tracking component is produced in the form of a wheel which is mounted idly about an axis perpendicular to the axis of the screw.

It will be noted that, on approaching the clamping point, the reversibility of the screw and nut system means that, through one of the tracking components, this tracking component will rest on one of the slideways or guides in order to relieve the screw of the increase in the torque and in the axial force due to the apparent reduction in the pitch.

As a result, the smaller the actual pitch, the greater the portion of the force absorbed by one of the slideways. As a result, a large proportion of the force is absorbed by the slideway and not by the screw.

As a result, it is possible to reduce the weight of the screw and therefore the weight of the motorisation means as far as possible, whatever the clamping force desired. It further allows all the performance to be maintained in the first phase of displacement, also known as "inertial phase".

It will be appreciated that this may be achieved simply with a wheel rolling in a single groove. In this case, functional clearance must be provided to guarantee good displacement of the wheel in said groove.

In a preferred embodiment of the invention, the device comprises a hollow cylindrical support in which the screw and the nut are accommodated and which has a cylindrical wall in which the or each slideway is formed.

To achieve perfect operation, the or each slideway has a width which is sufficient to receive the tracking component with minimal clearance.

According to a further characteristic of the invention, the established pitch of the second guide means may be constant or variable. The established pitch is that which follows the transition zone between the portion with linear guidance and the portion with helical guidance.

In the invention, the screw is advantageously mounted in a floating manner and the guide means are advantageously mounted on supports which impart a certain degree of compliance to the system.

In addition, an electric motor coupled to a numerical control system will advantageously be used.

The device of the invention advantageously comprises a fixed support which carries the motor and one of the two members, known as the "fixed member" and a moving support linked in translation with the nut and carrying the other of the two members known as the "moving member".

From another point of view, the invention relates to a clamping tool comprising two members, or arms, adapted to be moved together or apart, this tool being equipped with a driving device as defined hereinbefore.

The clamping tool is advantageously produced in the form of pincers, in particular welding pincers.

BRIEF DESCRIPTION OF DRAWINGS

In the following description which is given merely by way of example, reference will be made to the accompanying drawing, in which.

DESCRIPTION OF PREFERRED EMBODIMENT

Figure 1:
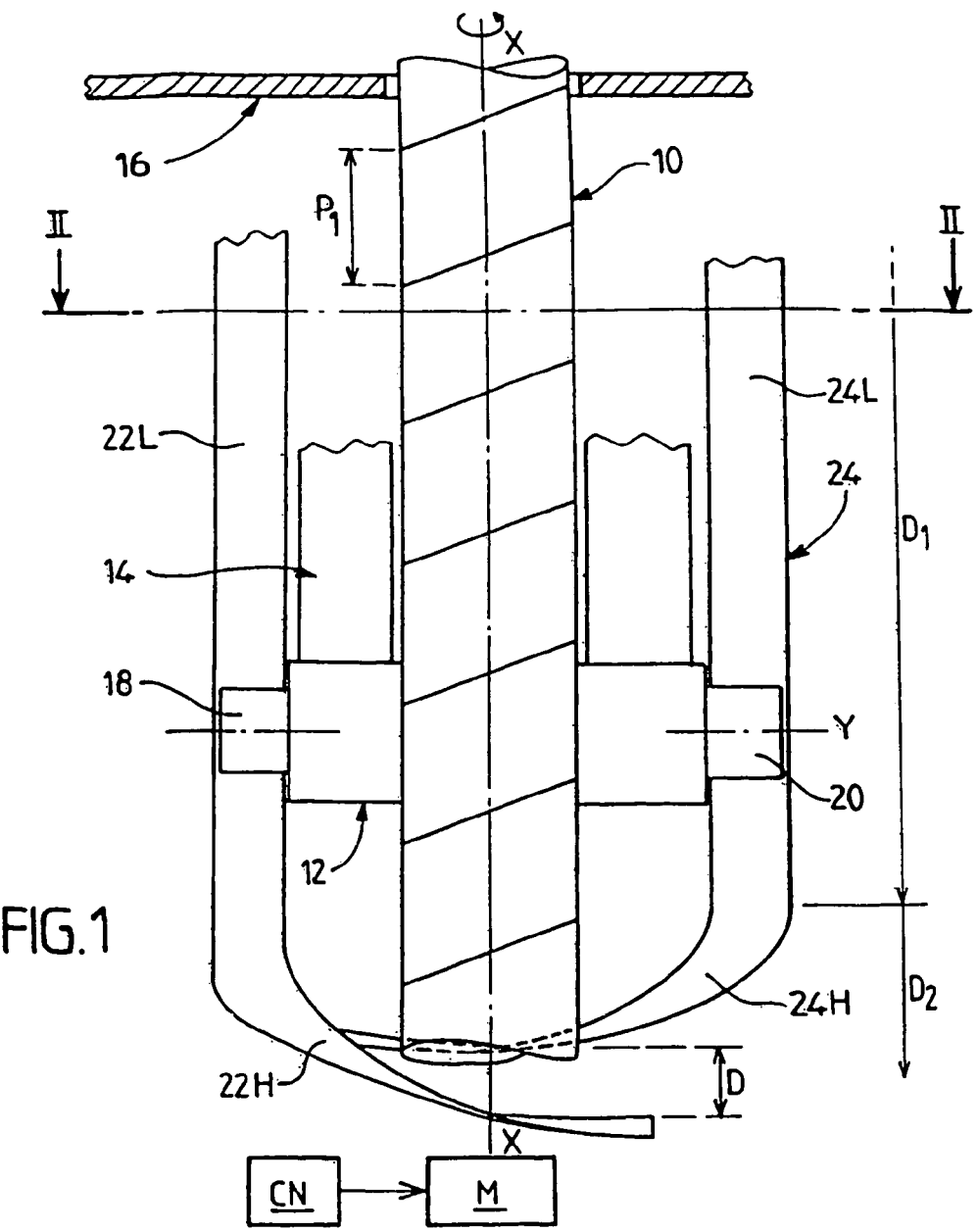
FIG. 1 is a partial elevation of a driving device according to a first embodiment of the invention.
Figure 2:
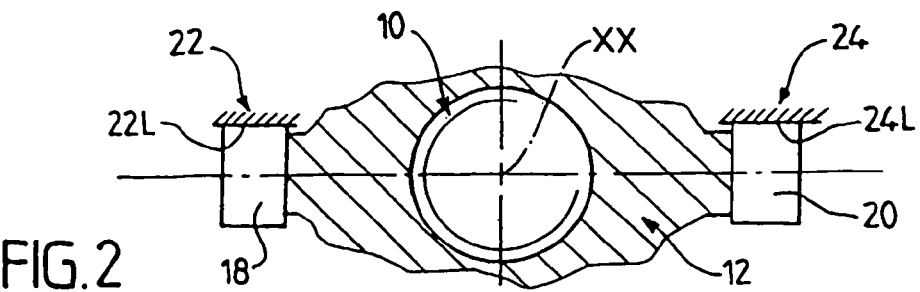
FIG. 2 is an end view of the device of FIG. 1.

The device shown in FIGS. 1 and 2 comprises a screw 10 adapted to be set into rotation about an axis XX via an electric motor M coupled to a numerical control CN.

A ball or rolled thread screw or else a similar screw will preferably be used. The screw has a large pitch P1 and is therefore reversible and has high direct and reverse yields. This screw may be set into rotation in either direction about is axis via the motor M.

The screw cooperates with a nut 12 adapted to be set into translation in the direction of the axis XX of the screw. The nut 12 is integral in translation with a support 14 produced here in the form of a tubular element which at least partially surrounds the screw 10. This support is intended to be connected to a moving member 16 shown schematically here.

In the embodiment, the screw 10 has a right-hand pitch of which the value is advantageously approximately equal to its diameter.

The nut 12 is equipped with a pair of wheels 18 and 20 which from tracking elements and are mounted rotatably about an axis YY perpendicular to the axis XX of the screw.

These two wheels are intended to roll against two slideways 22 and 24 respectively, also known as guides. The slideway 22 comprises a linear portion 22L which extends parallel to the axis of the screw to provide linear guidance for the nut as well as a helical portion 22H which is connected to the liner portion 22L to provide helical guidance. This helical portion extends along the axis XX of the screw and has a pitch P2 which is the reverse of the pitch P1 of the screw. In the embodiment, the pitch P2 is a left-hand pitch.

In a corresponding manner, the slideway 24 comprises a linear portion 24L which extends parallel to the axis XX and a helical portion 24H which is connected to this linear portion to provide helical guidance.

As shown in FIG. 1, however, the two helical portions 22H and 24H are offset axially by a distance corresponding to the diameter D of the wheel 18 and 20.

As shown in FIG. 2, the linear portions 22L and 24L of the slideways are located on the same side of the axis YY and therefore prevent the nut from turning, whatever the direction of rotation of the screw and the direction of the force to be transmitted. Therefore, when the wheels 18 and 20 are in contact with the portions 22L and 24L, the portions 22L and 24L prevent the nut from turning and the nut moves in translation at a linear velocity imposed by the angular velocity of the motor and the pitch P1 of the screw. This constitutes a first phase of displacement D1 (also known as travel) which may also be described as the inertial phase.

As the clamping point is approached, in other words when the nut 12 approaches the helical portions 22H and 24H, these helical portions set the nut into rotation in the same direction as the rotation of the screw. As a result, the linear velocity of the nut diminishes until it optionally becomes zero. In fact, this originates from an apparent variation in the pitch (in fact, the linear velocity of the nut is synchronised with the pitch P2). It should be noted that this pitch P2 may be constant or variable.

Consequently, if it is assumed that the screw 10 is set into rotation about its axis at a constant established angular velocity, the nut travels first (in the clamping direction) at a constant velocity in the phase D1 (inertial phase) and then at a slower velocity in a second phase D2.

During this second phase, the reversibility of the screw and nut system means that, via one of the two wheels 18 and 20, this system rests on one of the helical portions 22H and 24H, and this relieves the screw of the increase in the torque and the axial force due to the apparent reduction in the resultant pitch.

Therefore, the lower the actual pitch of one of the aforementioned helical parts, the greater the force absorbed by it. As a result, the force is absorbed, not by the screw but by one of the helical parts of the guide means.

Figure 3:
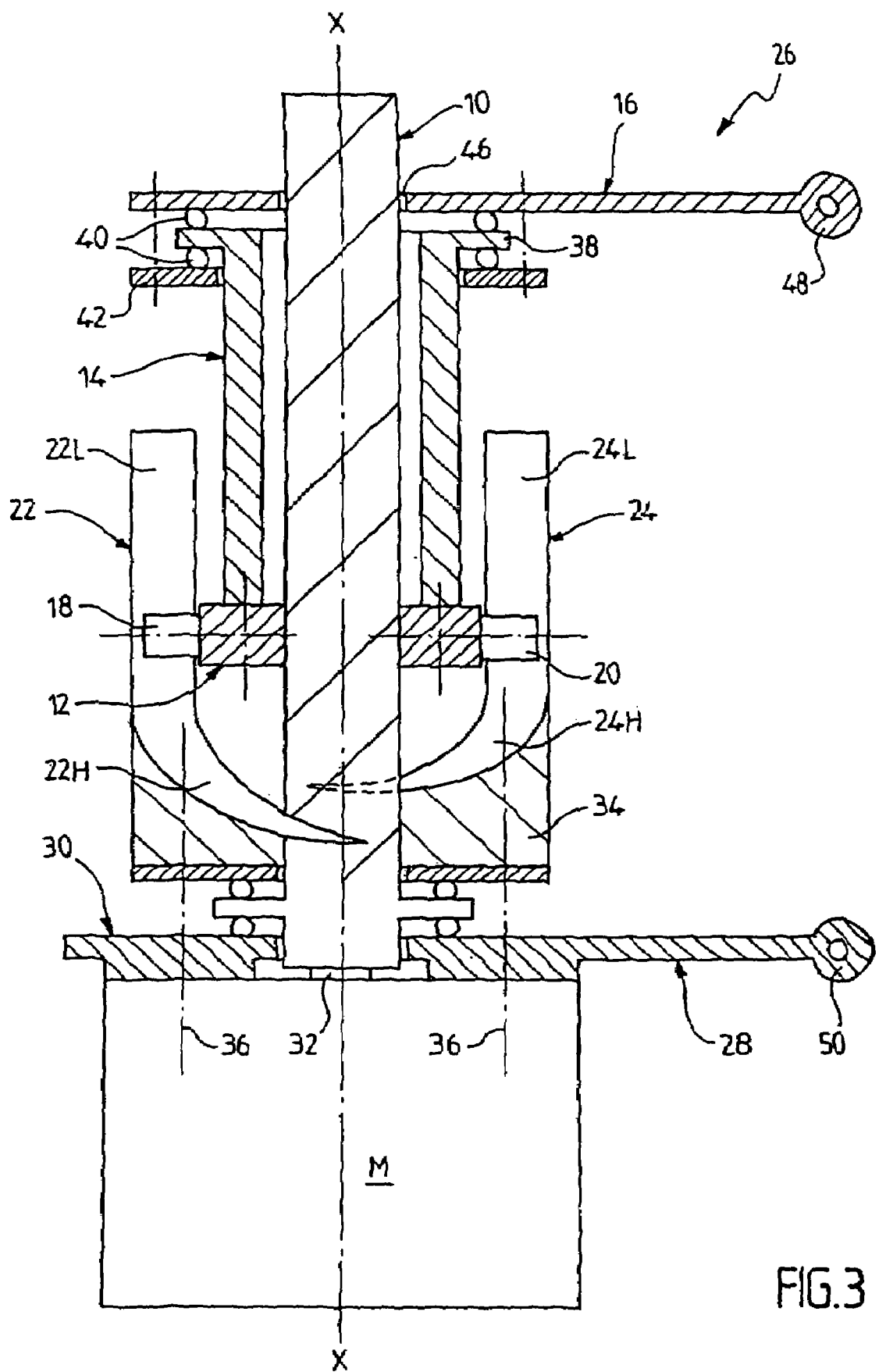
FIG. 3 is an axial section of a clamping tool equipped with a driving device according to the invention.

Reference will now be made to FIG. 3 which shows a clamping tool 26, for example welding pincers, which comprises a driving device as described hereinbefore and which is intended to exert a relative displacement on two members of the tool. These two members comprises a moving member 16 (also known as moving arm) and a fixed member 28 (also known as fixed arm).

The components common to those in FIG. 1 are designated by the same reference numerals.

The device comprises a fixed support 30 which carries the motor M as well as the fixed member 28.

The screw 10 is coupled to the shaft 32 of the motor via a floating coupling.

The slideways 22 and 24 are carried by a support 34 through which the screw passes and which is fixed to the support 30 of the motor via appropriate fixing means, for example screws, of which the axes 36 are shown in the drawing. The assembly thus formed by the support 34 and the screws having axis 36 has the flexibility required to impart a degree of self-adaptation, also known as compliance (in English) to the system. Good operation of the system is thus assured.

The support 14 connected to the nut 12 is also formed by a tubular component, as described hereinbefore. It has a collar 38 which is locked axially but not locked against rotation, by rolling members 40 held between a ring 42 forming a retainer ring and a disc 44 integral with the arm 16 and having an orifice 46 for the passage of the screw 10.

The moving member 16 and a fixed member 28 have respective fasteners 48 and 50 capable of being fixed to the two arms of the tool respectively.

These arms may be scissor-type arms, in other words arms with rotational displacement or else arms with linear displacement. In this latter case, they may be pincers known as J-type pincers, for example.

The clamping point need not necessarily be located at one end of the movement. Tools comprising a movement on each of the arms may also be envisaged.

In this case, two devices according to the invention but with reverse pitch each actuate one arm of the same tool.

Easy adjustment of the travel of the tool by relative displacement of the support 14 and of the slideways may also be envisaged.

Figure 4:
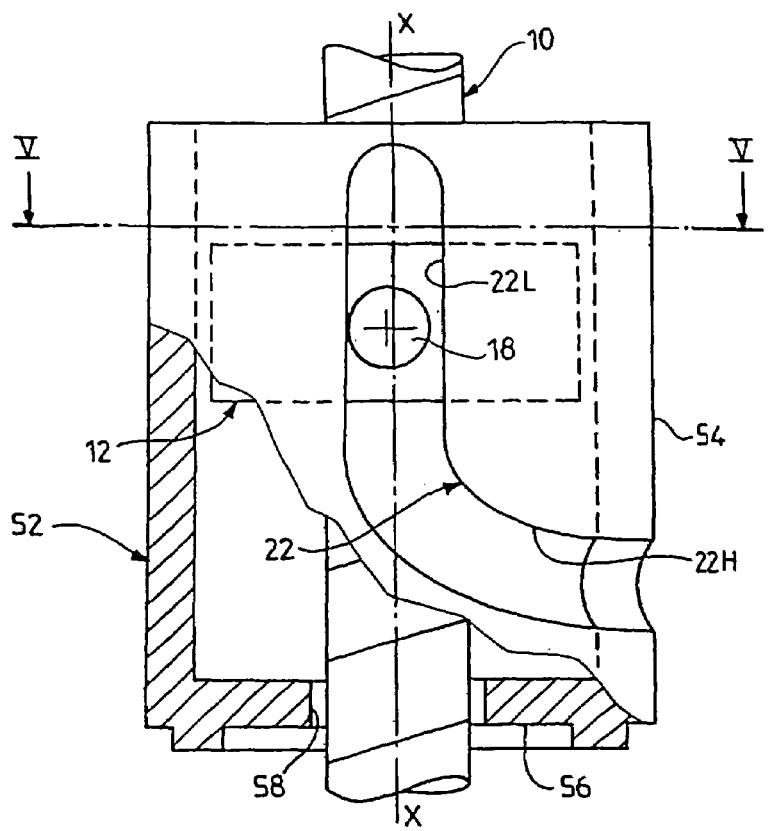
FIG. 4 is a partially broken away elevation of a driving device according to a second embodiment of the invention and FIG. 5 is a section along line V—V in FIG. 4.
Figure 5:
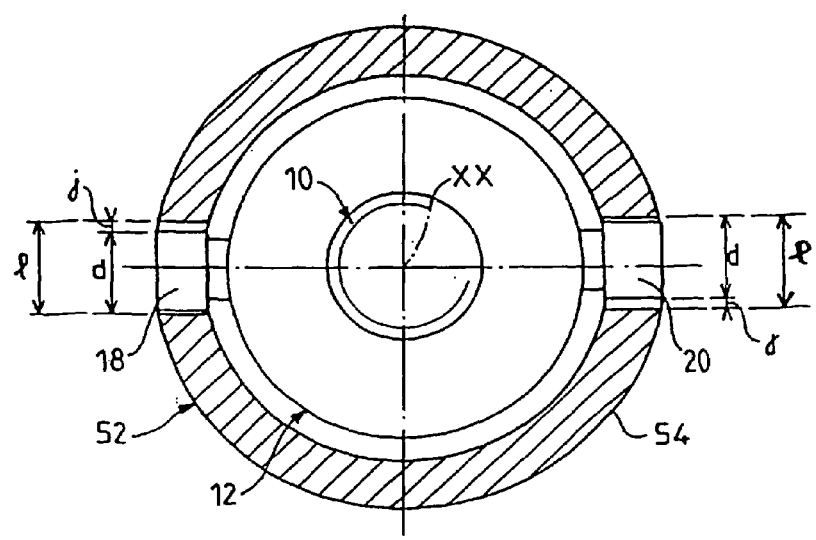

In the embodiment in FIGS. 4 and 5, the device of the invention comprises a hollow cylindrical support 52 in which the screw 10 and the nut 12 are accommodated. This support has a cylindrical wall 54 with axis XX and attached to a back wall 56 having a circular hole 58 for the passage of the screw 10.

The cylindrical support 52 is advantageously made of steel. Two slideways 22 and 24 are shaped in the cylindrical wall 54 in diametrically opposed positions. The slideway 22 comprises a linear portion 22L which is extended by a helical portion 22H. The slideway 24 (not shown is FIG. 4) has a shape identical to that of the slideway 22. These two slideways are formed directly by removal of material from the cylindrical wall 54 so that they each open at the interior and at the exterior of the cylinder thus formed.

The slideways may be single action or dual action slideways, depending on whether they transmit the forces in one direction or in both directions. In fact, the dual action slideway consists of two guides placed on either side of the same roller with adequate functional play.

In the embodiment of FIGS. 4 and 5, the two slideways 22 and 24 shaped in the cylindrical wall 54 are by nature dual action slideways, whether or not they are used in this configuration. This depends substantially on the value of the above-mentioned functional play.

Whatever the configuration adopted, the stress zones will be disposed between rollers and slideways so as to minimise the parasitic bending stress generated on the screw. Thus, for example, two dual action slideways will be diametrically opposed, three dual action slideways will be disposed at 120°, four dual action slideways will be disposed at 90° and so on.

Thus, as shown in FIGS. 4 and 5, each of the dual action slideways has a width 1 which is sufficient to receive the corresponding wheel 18 or 20 with minimal play j. In practice, the width 1 is greater than the diameter d of the roller to provide this minimal play j (see FIG. 5).

Functional play j which is sufficient to ensure good operation of the assembly should be provided in all cases.

Fitting on the screw stop and on the motor flange will be carried out under conditions of compliance, as defined hereinbefore.

It should be noted that the device of the invention is not limited to tools and in general it may be applied each time that a succession of inertial phases and clamping phases occurs over a movement. Thus, during the second phase of displacement of the nut, the two members are not necessarily closer together than during the first phase of displacement.

The scope of the invention also covers the provision of a mechanism with a small pitch screw and with one or more slideways which, in the inertial phase for example, increase the transverse pitch of the nut. As the small pitch screw performs clamping, however, it merely has to be able to withstand the force corresponding to this clamping.

It will be appreciated that it is possible to multiply the number of wheels either in one plane or in a plurality of planes in order to increase the force to be transmitted. In each case, these wheels will advantageously be disposed so as to reduce the parasitic bending forces on the screw as far as possible.

In the case of the structure having a hollow cylindrical support shown in FIGS. 4 and 5, slideways which do not open at the exterior of the cylindrical support could be provided to avoid weakening this cylindrical support. This result may be obtained by binding, machining, welding, assembly or any other method.

A preferred but not restricting application of the invention is in clamping pincers, in particular welding pincers.

The invention claimed is:

1. Driving device for the relative displacement of two members, in particular for the displacement of two arms of a clamping tool, comprising:
   a screw of the reversible type with a high yield and having a large pitch, said screw being capable of being set into rotation about an axis in one direction or in an opposite direction by a motor,
   a nut cooperating with the screw and designed to be driven in translation in the direction of the screw axis, said nut being integral in translation with one of the two members, said nut being provided with at least one tracking component,
   at least one slideway along which the at least one tracking component is adapted to travel, said at least one slideway comprising a linear portion parallel to the axis of the screw and a helical portion which is connected to the linear portion,
   the linear portion of the at least one slideway defining linear guidance parallel to the axis of the screw to lock the rotation of the nut in a first phase of displacement of the nut,
   the helical portion of the at least one slideway defining helical guidance which extends along the axis of the screw and which has a reverse pitch relative to the pitch of the screw to allow the rotation of the nut in the same direction of rotation as the screw in a second phase of displacement of the nut,
   to enable the transverse pitch of the screw and hence the translational speed of the nut to be decreased in this second phase of displacement, in which the nut exerts a clamping force, a large proportion of which is absorbed by the helical portion of the at least one slideway owing to the reversible screw.

2. Device according to claim 1, wherein the screw is selected from among a ball screw and a rolled thread screw.

3. Device according to claim 1, comprising at least one pair of opposing slideways with which there cooperates a pair of tracking components carried by the nut.

4. Device according to claim 1, wherein each tracking component is produced in the form of a wheel which is mounted idly about an axis perpendicular to the axis of the screw.

5. Device according to claim 1, comprising a hollow cylindrical support in which the screw and the nut are accommodated and which has a cylindrical wall in which each slideway is formed.

6. Device according to claim 5, wherein each slideway has a width which is sufficient to receive a tracking component with minimal clearance.

7. Device according to claim 1, wherein the pitch of the helical part of each slideway is constant or variable.

8. Device according to claim 1, wherein the screw is mounted in a floating manner and the linear part and the helical part of each slideway are mounted on supports which impart a degree of compliance to a system.

9. Device according to claim 1, wherein in the second phase of displacement of the nut the two members are closer to one another than in the first phase of displacement.

10. Device according to claim 1, wherein displacement between two clamping members caused by a differential movement between the screw and the nut is a linear displacement in the direction of the axis of the screw.

11. Device according to claim 10, wherein reversibility between the screw and the nut, under the effect of an axial force which is exerted in the direction of the displacement, provides systematic contacting of the at least one tracking component with the at least one slideway.

12. Device according to claim 11, wherein the at least one slideway provides the only substantial hindrance to rotation of the nut under the action of the axial force.

13. Device according to claim 1, wherein contacting of the at least one tracking component with the at least one slideway relieves the screw of a portion of the clamping force.

14. Device according to claim 1, wherein a significant play is provided between the nut and the screw to provide for self positioning of the at least one tracking component.

15. Device according to claim 1, wherein the linear portion and the helical portion of each slideway intervene successively for the displacement phases.

16. Device according to claim 1, wherein the clamping force is generated coaxially with the screw, the nut and the at least one slideway.

17. Clamping tool comprising two members capable of being moved together or apart, wherein the clamping tool is equipped with a driving device according to claim 1 for effecting the displacement of the members of the tool.

* * * * *